United States Patent [19]

Oku et al.

[11] Patent Number: 5,568,284

[45] Date of Patent: Oct. 22, 1996

[54] IMAGE RECORDING APPARATUS

[75] Inventors: Seiichiro Oku; Masahiro Kubo; Setsuji Tatsumi, all of Kanagawa, Japan

[73] Assignee: Fuji Photo Film Co., Ltd., Kanagawa, Japan

[21] Appl. No.: 286,232

[22] Filed: Aug. 5, 1994

Related U.S. Application Data

[63] Continuation of Ser. No. 856,735, Mar. 24, 1992, Pat. No. 5,489,996.

[30] Foreign Application Priority Data

Mar. 27, 1991 [JP] Japan .................................. 3-87814

[51] Int. Cl.⁶ ........................................................ G03F 3/08
[52] U.S. Cl. ........................ 358/518; 358/520; 358/521; 358/524; 395/131
[58] Field of Search ............................ 358/501, 504, 358/518, 520, 524, 530, 443, 448, 458; 395/100, 101, 109, 114, 118, 131

[56] References Cited

U.S. PATENT DOCUMENTS

| | | | |
|---|---|---|---|
| 4,831,409 | 5/1989 | Tatara et al. | 358/78 |
| 4,954,881 | 9/1990 | Kaye | 358/520 |
| 4,992,862 | 2/1991 | Gabor | 358/78 |
| 5,081,529 | 1/1992 | Collette | 358/80 |
| 5,146,328 | 9/1992 | Yamasaki et al. | 358/80 |
| 5,184,214 | 2/1993 | Tatsumi | 358/80 |

FOREIGN PATENT DOCUMENTS

| | | |
|---|---|---|
| 1206237 | 8/1989 | Japan . |
| 1206236 | 8/1989 | Japan . |
| 369369 | 3/1991 | Japan . |

*Primary Examiner*—Edward L. Coles, Sr.
*Assistant Examiner*—Thomas D. Lee
*Attorney, Agent, or Firm*—Sughrue, Mion, Zinn, Macpeak & Seas

[57] ABSTRACT

An image recording apparatus with good color reproduction and easy color adjusting function. An image recording apparatus includes a first color correction unit coupled to receive image signals from the image signal source, a second color correction unit coupled to receive output image signals of the first color correction unit, and a third color correction unit coupled to receive output image signals of the second color correction unit. The image recording apparatus further includes an adjusting device for at least the first color correction unit and the third color correction unit, and an adjustment information entering device. Good color reproduction is realized with color correction and data compression, and is not accompanied by hue change in color perception. Manufacturing variations in the color output unit are corrected by the third color correction unit. Easy setting of the reference for color adjustment independently of the input image signals is also realized by the unit.

2 Claims, 10 Drawing Sheets

IMAGE RECORDING APPARATUS

This is a continuation of application Ser. No. 07/856,735 filed Mar. 24, 1992 now U.S. Pat. No. 5,489,996.

BACKGROUND OF THE INVENTION

The present invention relates to an image recording apparatus for color-correcting image signals output from an image signal source and outputting image signals to record an image on an image recording medium.

There is known an image recording apparatus, as disclosed in Japanese Patent Laid-Open Publication No. Hei. 3-69369, which processes image signals from various types of color image signal sources, such as computer graphics systems, and outputs visible image signals onto an image recording medium. To record an image with a good color reproduction on the image recording medium using the image recording apparatus, color correction must be made in consideration of the color reproduction characteristics of the image signals from the image signal source, the image recording apparatus and the image recording medium. Further, the setting of the color correction must be frequently adjusted for, for example, the color adjustment according to the user's taste, and the compensation for the nonuniformity of the image record media.

Figure 4:
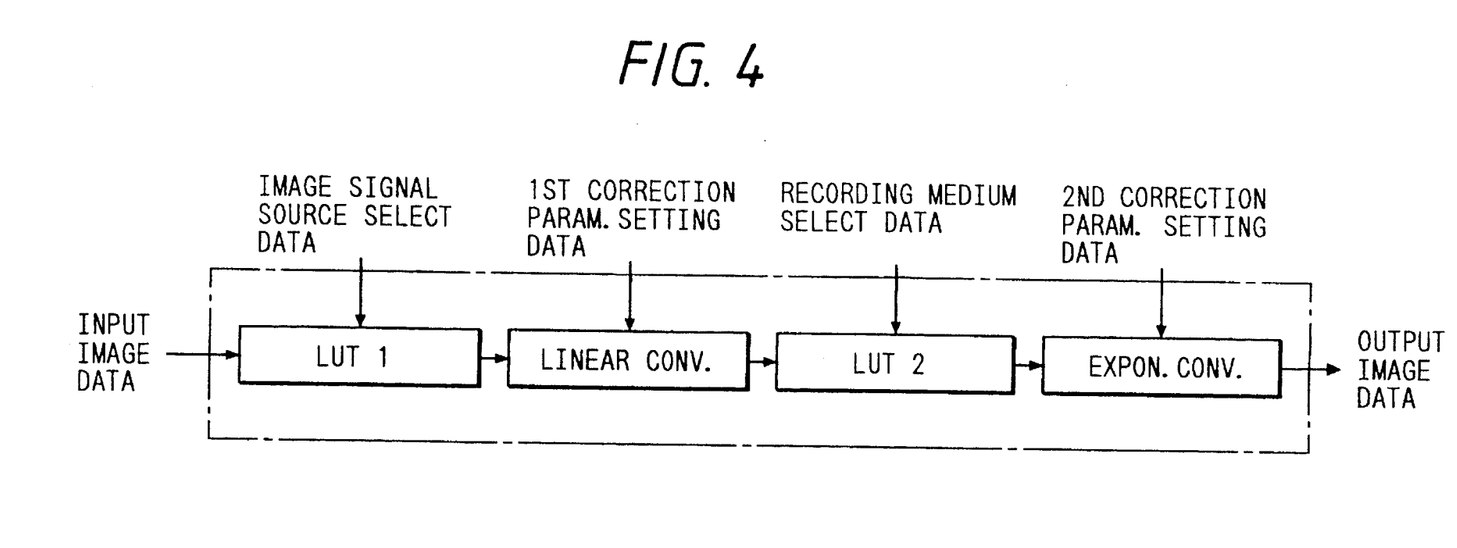
FIG. 4 is a block diagram showing the prior construction for color correction.

It has been known to employ the combination of two look-up tables and two exponential converters provided for each of three colors (FIG. 4). According to the image output unit, a first look-up table converts image signals from an image signal source into a region substantially linear with respect to optical density. As a result of the linear conversion in the density region, the colors can be adjusted substantially along the visual characteristics of a human being. With provision of the combination of a second look-up table and an exponential converter in the succeeding stage, good gray balance can be ensured independently of the nonuniformity of the recording media. The same can also be maintained when the optical density and hardness are adjusted.

Generally, complicated nonlinear relationships are present between input image color signals ($R_i$, $B_i$, and $G_i$ respectively representing red, green, and blue) and coloring materials ($C_O$, $M_O$, and $Y_O$ respectively representing cyan, magenta, and yellow) of the recording medium:

$$C_O = f(R_i, G_i, B_i)$$
$$M_O = g(R_i, G_i, B_i)$$
$$Y_O = r(R_i, G_i, B_i) \tag{1}$$

The color reproduction ranges of the input image color signals are frequently different from those of the recording medium. Particularly in a case where the input image signals are displayed on a color CRT monitor, when an image is recorded on a reflecting medium it is necessary to realize the compression of a preferable image reproduction region using formula (1) since the color reproduction range of the CRT monitor is very wide.

Also for color adjustment, it is necessary not only to consider human visual characteristics but also to use a color adjusting device designed in consideration of the input image signal characteristics.

Use of only the look-up tables provided for the respective colors allows the apparatus to effect only the correction for the relations given by formula (2). Therefore, the resultant color reproduction is unsatisfactory.

$$C_O = f(R_i)$$
$$M_O = g(G_i)$$
$$Y_O = r(B_i) \tag{2}$$

Further, the adjustment of hue and saturation is also impossible. The color balance adjustment, for example, is based on the hue of the coloring materials of the recording medium. Accordingly, the results of the adjustment do not always result in a natural-looking image.

A three-dimensional look-up table has been known for accurately correcting the relations of the formula (1). The look-up table is addressed with the respective colors of the input image signals. Where the input image color signal and the output image color signal are each expressed by 8 bits, a table memory of approximately 50M bytes ($2^{8 \times 8 \times 8} \times 3 \approx 50M$) is required. Use of such a large memory is uneconomical. Additionally, for the color adjustment, the table of 50M bytes must be rewritten, leading to poor efficiency of the color adjusting work.

In some recent usage of the system, a single image output unit is connected to a plurality of host computer graphic systems or the image output unit is located at a remote place or used by a plurality of users. When considering this trend of usage, it would be desirable to make the color adjustment from the host system. However, in the color adjustment, it is difficult to well manage the standard conditions of the image output unit.

When the image data transfer speed, the color correction processing speed of the image output unit, and the image recording speed are not matched, much time is taken for the image recording operation or, to avoid this, a large frame memory is required for the image output unit.

Accordingly, with view of solving the problems as stated above, the present invention has an object to an image recording apparatus which has a good color reproduction property and makes an easy color adjustment.

SUMMARY OF THE INVENTION

The above and other objects of the invention may be achieved by an image recording apparatus for processing, for color correction, image signals from an image signal source of a host computer and for forming image record signals to record an image on an image recording medium, the image recording apparatus comprising: color correction means including first color correction means coupled for reception with the image signals from the image signal source, second color correction means coupled for reception with the image signals of the first color correction means, and third color correction means coupled for reception with the image signals from the second color correction means; adjusting means provided for at least the first color correction means and the third color correction means; and adjustment information entering means.

The first color correction means may be implemented with look-up tables for the respective colors and a linear matrix, the look-up tables for the respective colors and the linear matrix being constructed with look-up tables provided for the respective colors and adders associated therewith.

The second color correction means may include a three-dimensional look-up table addressed with the n higher-order bits of each color and an interpolation unit using the m lower-order bits of each color, and the output signal of the first color correction means is previously compressed to $(2^{n+m}-2^m)$ gradations.

The second color correction means may be by-passed and include means for selecting the by-passing mode.

Also, the third color correction means may be implemented with look-up tables for the respective colors.

The adjusting means and the adjustment information entering means for the first color correction means are preferably capable of adjusting at least hue and saturation while the adjusting means and the adjustment information entering means for the first color correction means are capable of at least selecting the prestored look-up tables.

In preferred embodiments, the hue adjustment should be capable of recording achromatic colors. The adjusting means for the first color correction means is an adjusting means by which the adjustment is based on a hue different from that of the coloring material of the recording medium, and the adjusting means for the third color correction means is an adjusting means by which the adjustment is based on the same hue as that of the coloring material of the recording medium.

The adjustment information entering means includes instructions from an operation panel of the image recording apparatus and the image signal source, and the instructions from the operation panel and the image signal source are capable of making the same adjustment. The adjustment information entering means may also include instructions from an operation panel of the image recording apparatus and the image signal source, including the sum of a quantity of adjustment by the operation panel and a quantity of adjustment by an instruction from the image signal source.

The look-up tables for the respective colors may be downloaded from the image signal source, and the downloaded look-up table may be adjusted by the adjusting means and the adjustment information entering means for the first color correction means.

Preferably, the input of the third color correction means has a larger number of gradations than the output of the first color correction means, the output of the first color correction means is constantly normalized to the maximum number of gradations in the by-passing mode, the look-up table for the third color correction means is adjusted for the normalized gradations, thereby preventing the drop-out of the gradations.

The above and other objects of the invention may be met by an image recording apparatus for processing, for color correction, image signals from an image signal source of a host computer and for forming image record signals to record an image on an image recording medium, the image recording apparatus comprising: color correction means including look-up tables constructed with RAMs coupled for reception with image signals from the image signal source; adjusting means and adjustment information entering means, both for adjusting the color correction means; adjustment parameter storing means which retains its data even in the face of a power failure, whereby the calculation of the look-up table starts using the adjustment parameters provided only at the time of power on and the time of entering adjustment information.

Yet further, the invention provides an image recording apparatus for processing, for color correction, image signals from an image signal source of a host computer and for forming image record signals to record an image on an image recording medium, the image recording apparatus comprising: a frame memory for storing image signals from the image signal source and color correction means; whereby after image data of the frame memory is color corrected by the color correction means, the image data is stored again into the frame memory temporarily.

Moreover, the invention can be practiced by an image recording apparatus for processing, for color correction, image signals from an image signal source of a host computer and for forming image record signals to record an image on an image recording medium, the image recording apparatus comprising: at least three line buffers and color correction means; wherein three processings of the inputting of an image signal from the image signal source, the color correction by the color correction means, and the image recording are concurrently performed while the line buffers are appropriately switched.

The above and other objects can further be met by an image recording apparatus for processing, for color correction, image signals from an image signal source of a host computer and for forming image record signals to record an image on an image recording medium, the image recording apparatus comprising: color correction means coupled for reception with image signals from the image signal source; wherein the color correction processing by the color correction means is performed in consideration of the color adaptation effect.

In the above image recording apparatus, the color correction means may compress a color reproduction region of without changing hue. Otherwise, the color correction means may compress a color reproduction region without changing hue in color perception.

As described above, in the image recording apparatus of the invention, the first color correction unit corresponding to the image signal source normalizes the input image signals and converts them to the signals in a region suitable for the image output unit. The first color correction unit includes adjusting means and adjustment information entering means by which various color adjustments are carried out according to the image signal source. The color adjustments may be the adjustments of optical density, contrast, color balance, hue, saturation and the like. The normalized signals are applied to the second color correction unit for color correction purposes. In the second color correction unit, a nonlinear mapping is executed using a three dimensional look-up table, thereby to match the normalized image signals to the characteristics of the coloring materials of the image recording medium. The output data signals of the second color correction unit are applied to the third color correction unit. The third color correction unit corrects variations of the recording media and the apparatus, that is, executes the calibration. The third color correction unit is provided with adjusting means and adjustment information entering means, and receives adjustment information for compensating for the variations.

DESCRIPTION OF THE PREFERRED EMBODIMENTS

FIGS. 7(a) and 7(b) are diagrams showing the detailed construction of an input data normalizing unit of the first color correction unit, in which FIG. 7(a) depicts the normalizing unit for R, G, and B or C, M, and Y color signals, and FIG. 7(b) the same for color code data;

DESCRIPTION OF THE PREFERRED EMBODIMENTS

Preferred embodiments of the present invention will now be described with reference to the accompanying drawings.

Overall Configuration of First Embodiment

Figure 1:
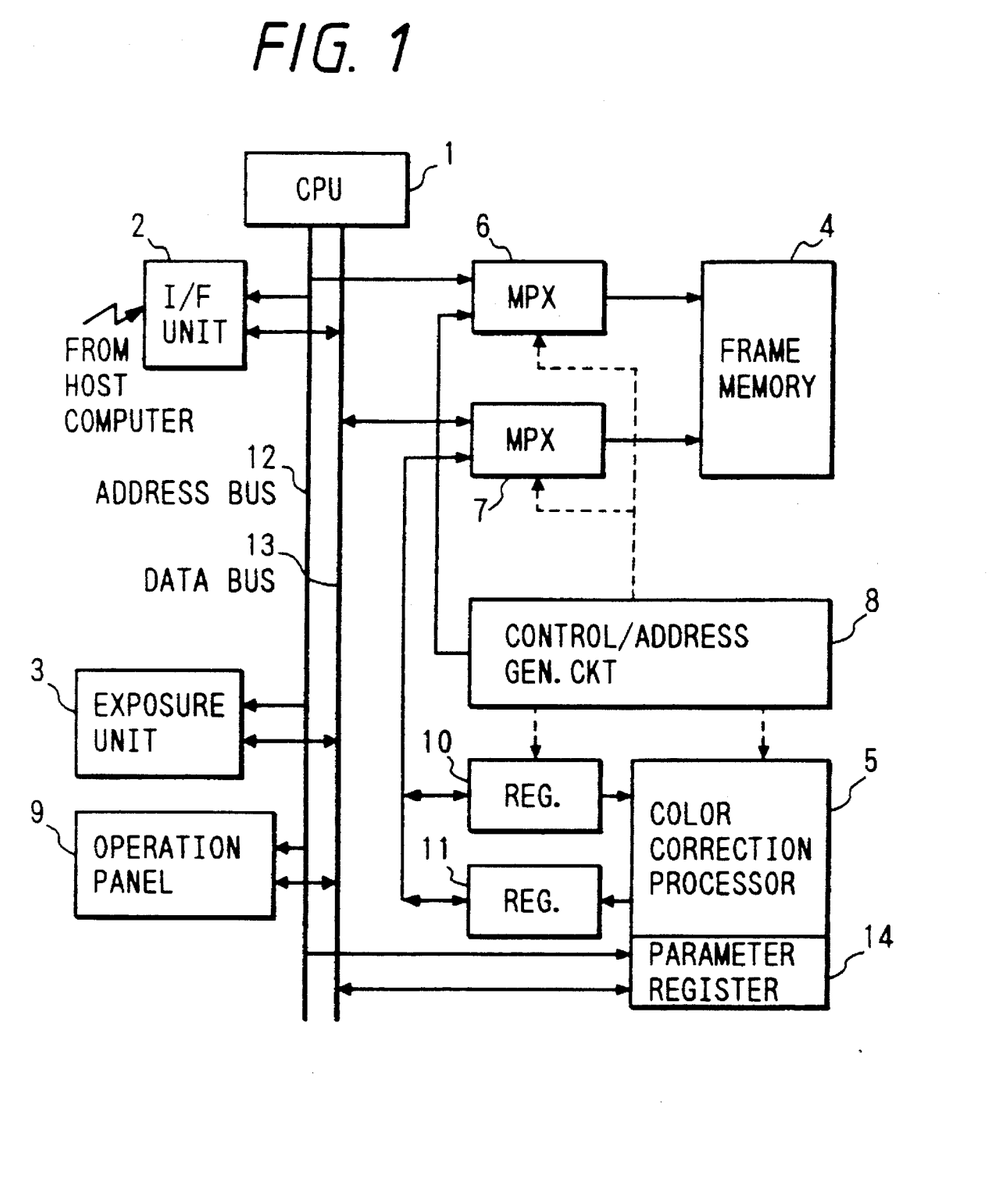
FIG. 1 is a block diagram showing an arrangement of an image recording apparatus using a frame memory.

The overall configuration of a first embodiment of an image recording apparatus constructed according to the present invention will be described with reference to FIG. 1. In this apparatus, a frame memory is used.

The image recording apparatus receives image data from a host computer, through an I/F unit 2, and writes the image data of one frame into a frame memory 4. Upon completion of the writing of one frame of image data, multiplexers 6 and 7 are switched so as to allow a color correction processor 5 and a control/address generator 8 to make an access to the frame memory 4. The control/address generator 8 successively generates address signals. With the address signal, image data is read out of the frame memory 4, and is transferred to the color correction processor 5. Upon receipt of the data, the color correction processor executes necessary processings. For example, it processes the received image data for color correction.

After the control/address generator 8 is driven, the processed data from the color correction processor 5 is written again into the frame memory 4. The control/address generator 8 is driven so that the data is written into the same address as that from which the data was read.

Thus, in this embodiment, the result of the color correction processing is returned to the memory location of the same address. This eliminates the necessity of using a frame memory having the storage capacity of a plurality of frames for the correction processing, leading to a reduction of the circuit size and cost to manufacture.

After the processing of one frame is completed, the multiplexers 6 and 7 are switched so that a CPU 1 can access the frame memory 4. The image data of one frame is transferred to an exposure unit 3, and finally is recorded.

To adjust the color correction processor, adjustment information is entered through the I/F unit 2 to the apparatus, from an operation panel 9, operated as an adjustment information entering device, or from a host computer. Using the adjustment information, the CPU 1 computes table data and parameters necessary for the color correction processing, and sets the table data and parameters in the color correction processor 5, through a parameter register 14.

Overall Configuration of Second Embodiment

The overall configuration of a second embodiment of an image recording apparatus constructed according to the present invention will be described with reference to FIGS. 2 and 3. In this embodiment of the inventive apparatus, line buffers are used. In the description to follow, only the transfer of image data using the line buffers will be described since the configuration of the apparatus is substantially the same as that in the first embodiment.

Figure 2:
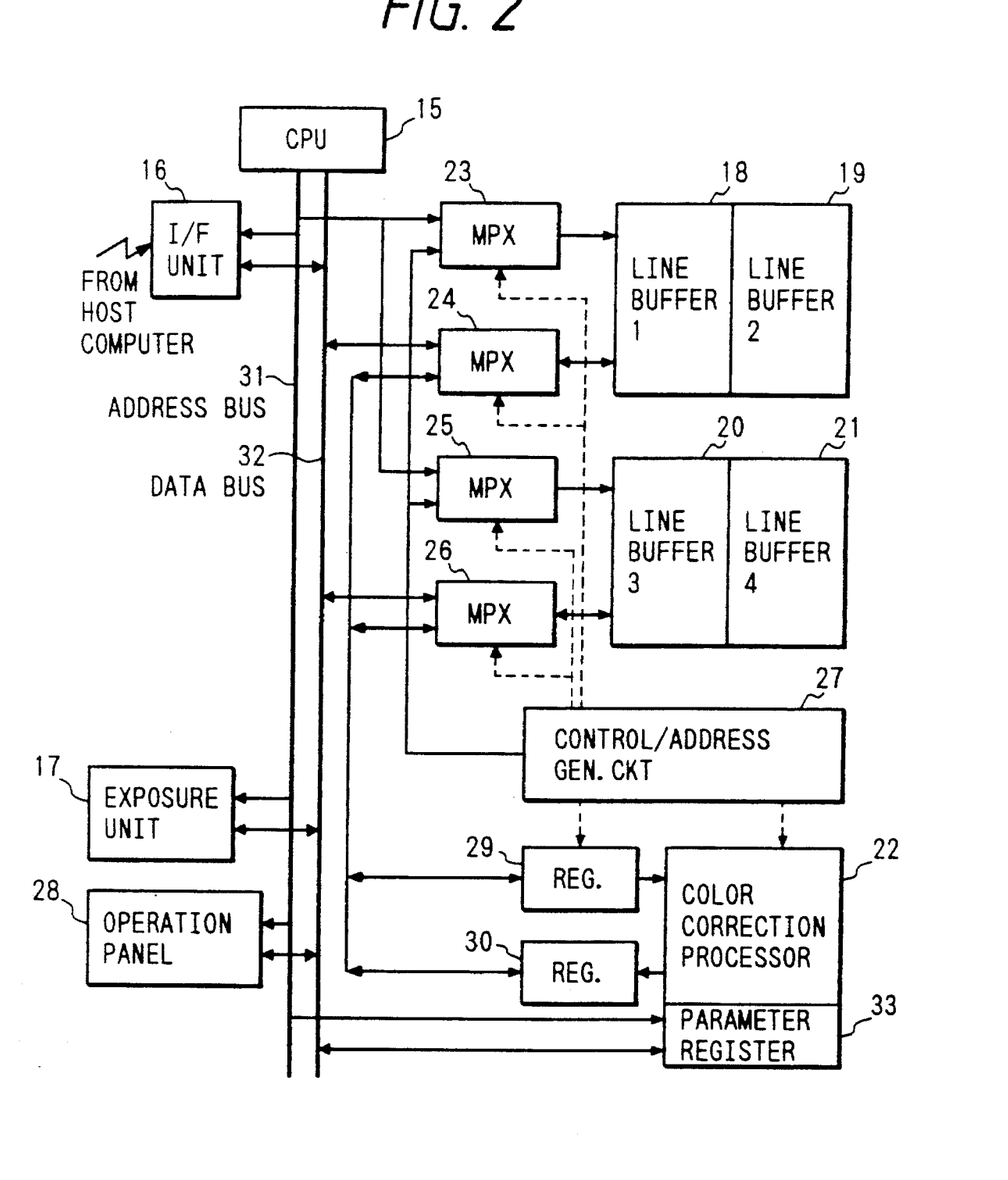
FIG. 2 is a block diagram showing an arrangement of an image recording apparatus using line buffers.

FIG. 2 shows the overall configuration of the apparatus of the second embodiment. FIG. 3 is a diagram showing the operating sequence of the apparatus when the operations of inputting image data, color correction processing, and recording image data are concurrently carried out.

A description of the second embodiment of the image recording apparatus will be given with reference to FIGS. 2 and 3.

Figure 3:
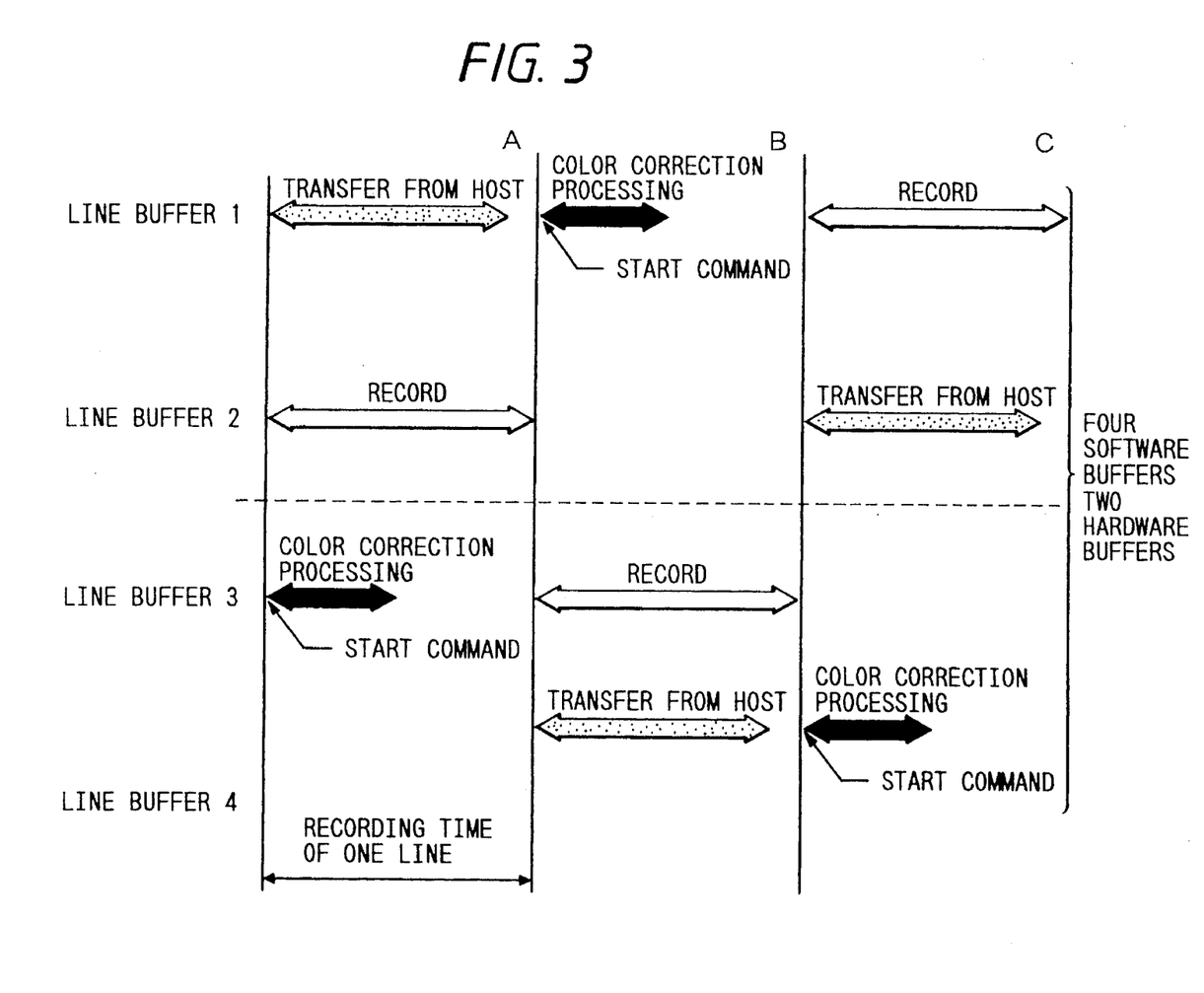
FIG. 3 is a diagram showing a sequence of image data transfer using the line buffers.

In the first phase A in FIG. 3, multiplexers 23, 24, 25, and 26 connect line buffers 1 (18) and 2 (19) to a CPU (15), and line buffers 3 (20) and 4 (21) to a color correction processor 22 and a controller 27. In this phase, the image data from a host computer is written into the line buffer 1 (18) by the CPU 15. At the same time, the image data, which have been stored into the line buffer 2 (19) by the DMA function of the CPU before the phase A, is read out of the buffer.

Upon completion of writing one line data, the multiplexers 23, 24, 25, and 26 are switched to other states to set up another phase (phase B). In this phase, the line buffers 1 and 2 (18 and 19) are connected to the color correction processor 22 and the controller 27, and line buffers 3 and 4 (20 and 21) are connected to the CPU 15.

The color correction processor 22 processes the data from the line buffer 1 (18), for color correction. At the same time, the CPU 15 loads (inputs) data into the line buffer 4 (21), and reads (outputs) data from the line buffer 3 (20).

When the processing of one line is completed, the multiplexers 23, 24, 25, and 26 are switched to set up again the phase A. Subsequently, the sequence of the input→processing→output operations is repeated. In this way, the input of image data from the host computer, the recording (exposure) of the image data and the calculations are performed uninterruptedly, as shown in FIG. 3, so that a high speed image recording operation is realized without using a frame memory.

In this instance, four line buffers are used but, if required, three line buffers may be used to achieve the same function.

Color Correction Processor

Figure 5:
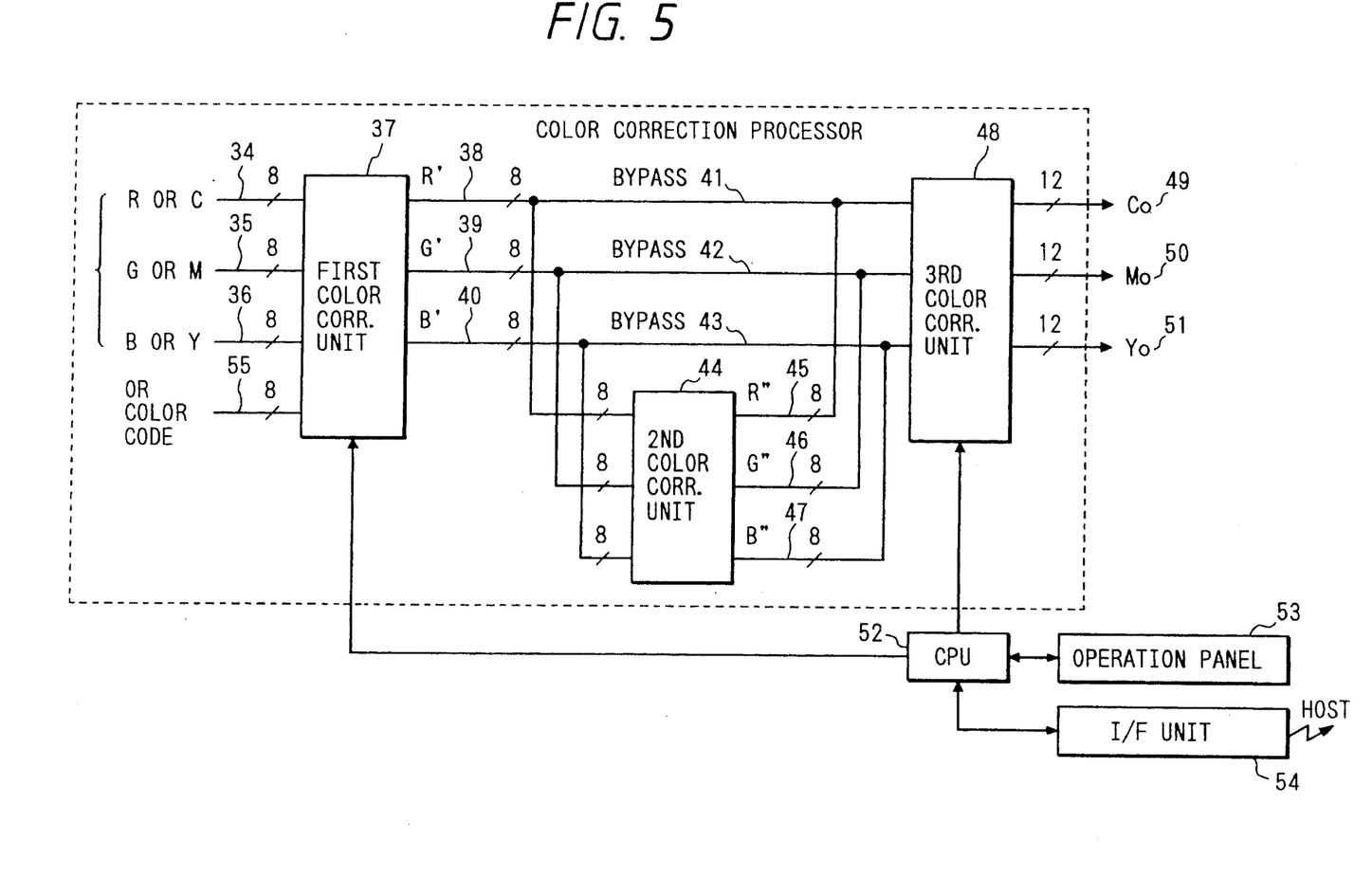
FIG. 5 is a block diagram showing a color correction processor of the image recording apparatus of the present invention.

The color correction processor will now be described. As shown in FIG. 5, the color correction processor is composed of a first color correction unit 37, a second color correction unit 44, and a third color correction unit 48. A CPU 52, acting as an adjusting device for the first and third color correction units, is connected to the first color correction unit 37 and the third color correction unit 48. An operation panel, acting as an adjustment information entering device, is connected to the CPU 52. The adjustment information may also be entered from a host computer through an I/F unit 54.

The first color correction unit 37 normalizes input image signals and converts them to the data signals in a region suitable for the color adjustment for the input image signals, and makes the color adjustment. More specifically, the first color correction unit normalizes and color-adjusts the image data R (34), G (35), and B (36) or C (34), M (35), and Y (36), each consisting of eight bits, received from the host computer to yield image data R' (38), G' (39), and B' (40), or normalizes and color-adjusts color code image data 55 of eight bits for each pixel into the image data R' (38), G' (39), and B' (40). In this region, when R'=G'=B', achromatic color is produced.

The second color correction unit 44 converts the image data R' (38), G' (39), and B' (40), which were color adjusted and normalized by the first color correction unit 37, into image data R" (45), G" (46), and B" (47), which are matched to the characteristics of the coloring materials of the recording medium using the nonlinear mapping. When R"=G"=B", achromatic color is produced.

The third color correction unit 48 is provided for the calibration for compensating for the nonuniformity of recording materials, for example. Specifically, it converts the output data R" (45), G" (46), and B" (47) of the second color correction unit into data $C_0$ (49), $M_0$ (50), and $Y_0$ (51).

The second color correction unit may be selectively used. When it is not used, the output data R' (38), G' (39), and B' (40) are transferred to the third color correction unit through bypasses 41, 42, 43. The bypasses are useful when special color correction is carried out within the host computer or for current image data of a type which cannot be handled by the second color correction unit.

First Color Correction Unit

The first color correction unit functions to normalize input image data and to make a color adjustment of the input image data, and to convert color code data into the required form of image data.

Figure 6:
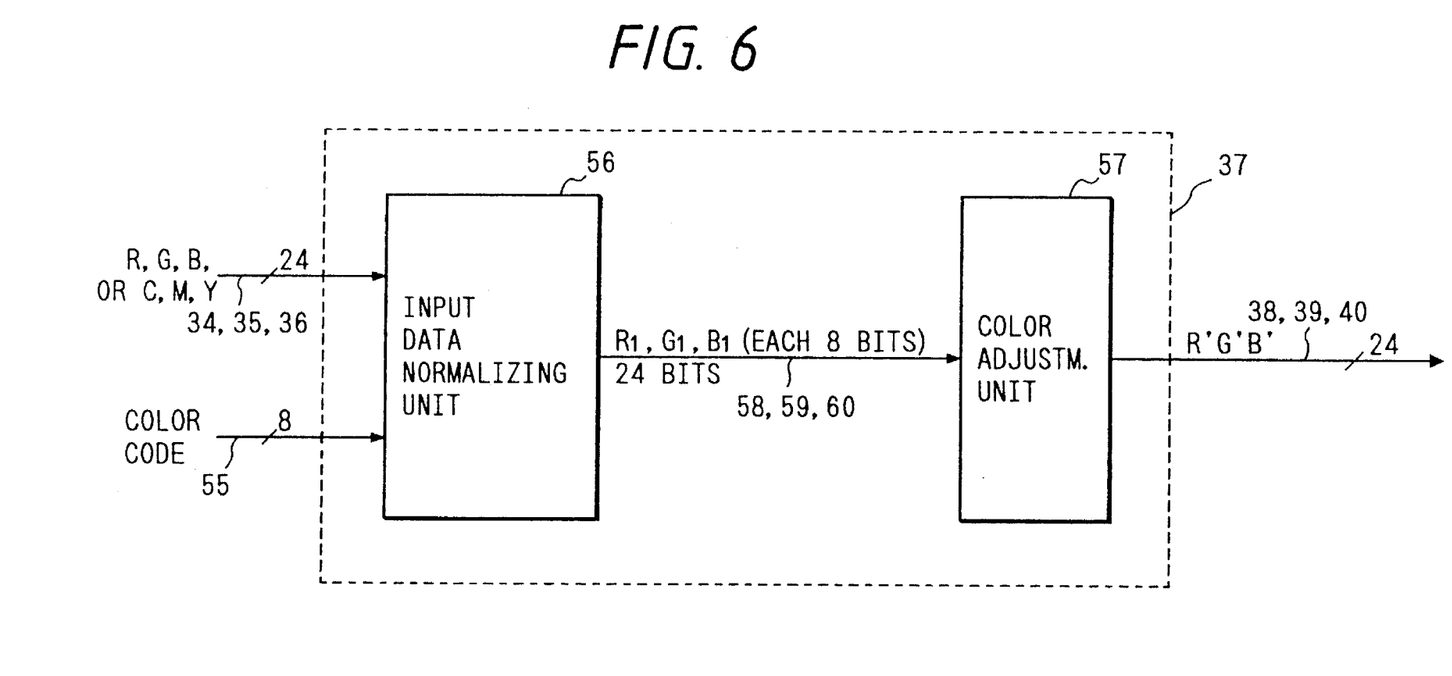
FIG. 6 is a block diagram showing a first color correction unit of the color correction processor.
Figure 7A:
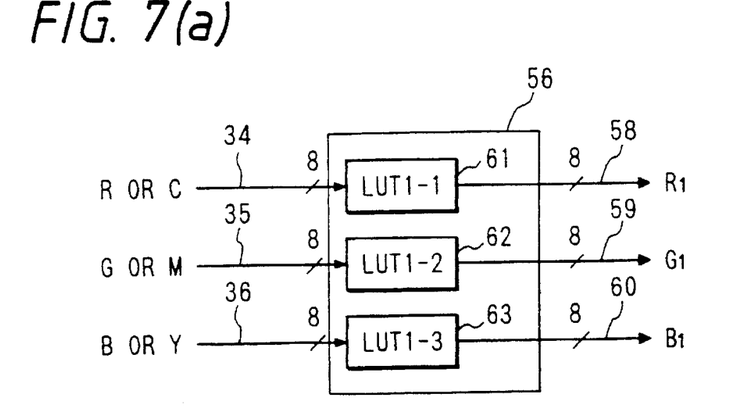
Figure 7B:
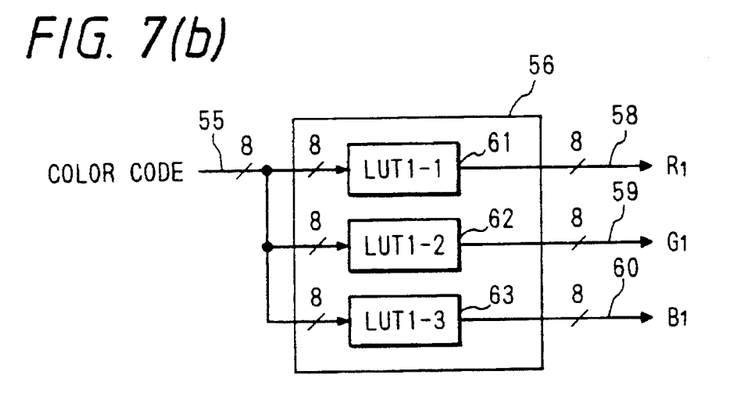

FIG. 6 is a block diagram showing the arrangement of the first color correction unit. FIG. 7 shows in block form the detailed arrangement of an input data normalizing unit 56.

The input data normalizing unit 56 receives the image data from the host computer, and converts them into R, G, and B data each consisting of eight bits, through gradation converting tables LUT1-1 61, LUT1-2 62, and LUT1-3 63. Those tables are provided for three colors. A user may write data into those tables. The tables to be written into the tables LUT1-1 61, LUT1-2 62, and LUT1-3 63 are transferred from the host computer through the I/F unit 54 and the CPU 52 in a predetermined communication procedure. When values are not set in the tables LUT1-1 61, LUT1-2 62, and LUT1-3 63, the value of γ=1 (an output signal "i" (i=0, 1, . . . , 255) is made to correspond to an input signal "i") is automatically set in those tables.

When input data is negative data (C, E, Y), it can be converted into positive data (R, G, B) of a preset gradation by replacing the contents of the tables LUT1-1 61, LUT1-2 62, and LUT1-3 63 with the results of subtraction of the contents of the tables from 255.

When input data is color code data 55, the LUT1-1 61, LUT1-2 62, and LUT1-3 63 produce R, G, and B data, each consisting of eight bits, by assigning the same input data to three color input signals to those LUTs.

The color adjustment unit 57 matrix-calculates the output data $R_1$ (58), $G_1$ (59), and $B_1$ (60), thereby to execute the color adjustment.

The color adjustment is carried out using a conversion matrix determined by parameters, such as brightness, contrast, chroma, red, green, and blue. Brightness is the parameter for adjusting the brightness of an image, contrast is the parameter used for adjusting the gradation of an image, hue is the parameter used for adjusting the color balance of an image, chroma is the parameter used for adjusting the saturation of an image, red is the parameter used for adjusting the red tint of an image, green is the parameter used for adjusting the green tint of an image, and blue is the parameter used for adjusting the blue tint of an image.

The value of each parameter is stepwise set on the operation panel 53. The CPU 52 sets matrix calculation parameters in the color adjustment unit 57 according to the parameter values thus set. The parameter values may be altered also from the host computer. Values transferred through the I/F unit 54 by predetermined communication devices are additively applied to the parameter values by the CPU 52.

Color adjustment is carried out after the image data is separated into luminance information and color component information. More specifically, after the image data R, G, and B is converted into Y, I and Q signals of the NTSC standard, for example, the following conversions are performed using the values Br, Ct, H, Cr, r, g, and b of the parameters brightness, contrast, hue, chroma, red, green, and blue.

Brightness adjustment:

$$Y'=Y+Br \qquad (3)$$

Gradation adjustment:

$$Y'=Ct \cdot (Y-0.53)+0.53$$

$$I'=Ct \cdot I$$

$$Q'=Ct \cdot Q \qquad (4)$$

Hue adjustment:

$$I'=I \cdot \cos H - Q \cdot \sin H$$

$$Q'=I \cdot \sin H + Q \cdot \cos H \qquad (5)$$

Color tint adjustment:

$$\Delta I' = r \cdot \sin \theta_r + g \cdot \sin \theta_g + b \cdot \sin \theta_b$$

$$\Delta Q' = r \cdot \cos \theta_r + g \cdot \cos \downarrow_g + b \cdot \cos \theta_b \qquad (6)$$

Saturation adjustment:

$$I'=Cr \cdot I$$

$$Q'=Cr \cdot Q \qquad (7)$$

Figure 8:
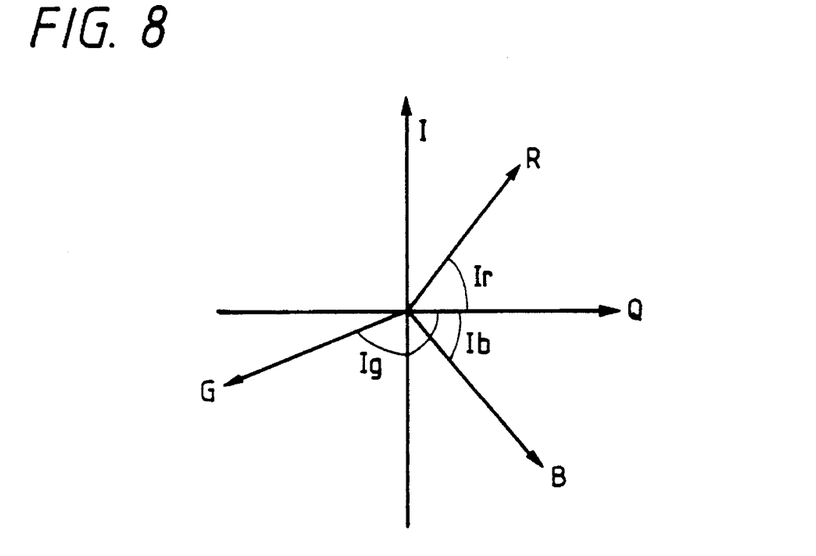
FIG. 8 is a vector diagram showing the relationships between R, G, and B color signals and Y, I, and Q color signals.

In the above formulae, $\theta_r$, $\theta_g$, and $\theta_b$ define the directions of the colors R, G and B on an I-Q plane of a vector diagram shown in FIG. 8.

From the relationships of image data R, G, and B and Y, I, and Q signals, we have:

$$\begin{pmatrix} Y' \\ I' \\ Q' \end{pmatrix} = \begin{pmatrix} Ct & 0 & 0 \\ 0 & Ct \cdot Cr \cdot \cos H & -Ct \cdot Cr \cdot \sin H \\ 0 & Ct \cdot Cr \cdot \sin H & Ct \cdot Cr \cdot \cos H \end{pmatrix} \cdot \begin{pmatrix} Y \\ I \\ Q \end{pmatrix} + \begin{pmatrix} Br + 0.53 \cdot (I - Ct) \\ Q_1 \cdot \cos H - Q_2 \cdot \sin H \\ Q_1 \cdot \sin H + Q_2 \cdot \cos H \end{pmatrix} \tag{18}$$

where
$Q_1 = \gamma \cdot \sin I_r + g \cdot \sin I_g + b \cdot \sin I_b$
$Q_2 = r \cdot \cos I_r + g \cdot \cos I_g + b \cdot \cos I_b$ $$\begin{pmatrix} R' \\ G' \\ B' \end{pmatrix} = \begin{pmatrix} 1 & 0.948262 & 0.624013 \\ 1 & -0.276066 & -0.639810 \\ 1 & -1.105450 & 1.729858 \end{pmatrix} \begin{pmatrix} Ct & 0 & 0 \\ 0 & Ct \cdot Cr \cdot \cos H & -Ct \cdot Cr \cdot \sin H \\ 0 & Ct \cdot Cr \cdot \sin H & Ct \cdot Cr \cdot \cos H \end{pmatrix} \cdot \tag{9}$$

$$\begin{pmatrix} 0.30 & +0.59 & 0.11 \\ 0.60 & -0.28 & -0.32 \\ 0.21 & -0.52 & 0.31 \end{pmatrix} \begin{pmatrix} R \\ G \\ B \end{pmatrix} + \begin{pmatrix} 1 & 0.948262 & 0.624013 \\ 1 & -0.276066 & -0.639810 \\ 1 & -1.105450 & 1.729858 \end{pmatrix} \begin{pmatrix} Br + 0.53 \cdot (I - Ct) \\ Q_1 \cdot \cos H - Q_2 \cdot \sin H \\ Q_1 \cdot \sin H\, Q_2 \cdot \cos H \end{pmatrix} = \begin{pmatrix} a_{00} & a_{01} & a_{02} \\ a_{10} & a_{11} & a_{12} \\ a_{20} & a_{21} & a_{22} \end{pmatrix} \begin{pmatrix} R_1 \\ G_1 \\ B_1 \end{pmatrix} + \begin{pmatrix} b_0 \\ b_1 \\ b_2 \end{pmatrix}$$

Using the formulae above, the normalized input data $R_1$ (58), $G_1$ (59), and $B_1$ (60), each consisting of eight bits, are converted into the color-adjusted data R' (38), G' (39), and B' (40) each of eight bits.

Thus, in the first color correction unit 37, a variety of color adjustments can readily be carried out. The hues of image data R, G, and B as the reference for color adjustment are set independently of the hues of the image recording materials. Accordingly, by matching the hues of the R, G, B image data to those of the color CRT monitor, the color adjustment can be carried out according to the human sense of color and hence intelligibly.

Achromatic color can be recorded when $a_{00}=a_{10}=a_{20}$, $a_{01}=a_{11}=a_{21}$, and $a_{02}=a_{12}=a_{22}$ in formula (10) for saturation adjustment.

Figure 9:
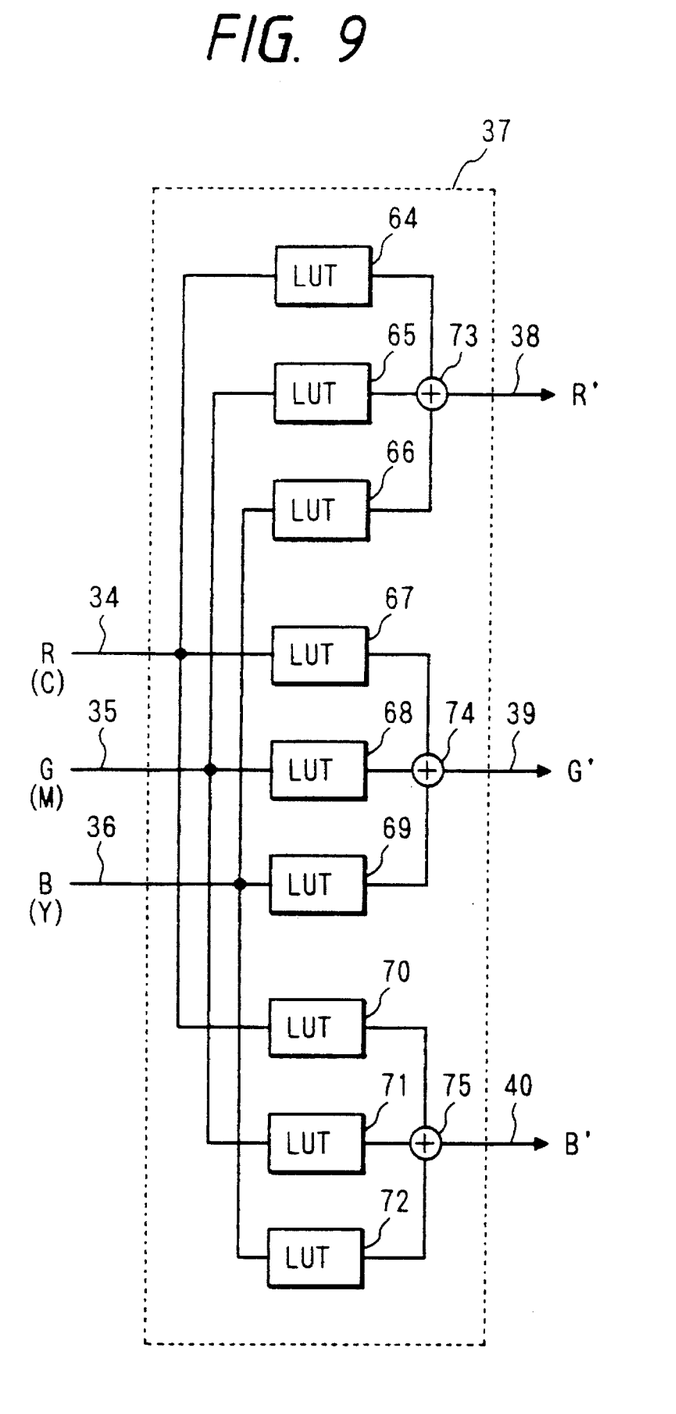
FIG. 9 is a block diagram showing a hardware implementation of the first color correction unit.

The hardware of the first color correction unit may be constructed as shown in FIG. 9. As shown, the three look-up tables 61, 62, and 63 of the input normalizing unit and the linear matrix calculator 57 are constructed with a total of nine look-up tables 64 to 72 and three adders 73, 74, and 75.

In a nonselect mode in which the second color correction unit 44 is not selected for use, the rounded error can be reduced in the following manner.

Assuming the maximum and minimum values of the converted R data are represented by $R_{max}$ and $R_{min}$, the R data ranges between $R_{max}$ and $R_{min}$. When the variation is smaller than 255, if the calculation result is converted into an eight-bit integer, the converted data fails to maintain the 256 gradations. To cope with this, the calculated R data is further converted in accordance with formula (10) below so that the converted data always maintains the 256 gradations. In the third color correction unit 48 to be described later, calculation is made using the parameters $R_{max}$ and $R_{min}$ to form a look-up table with the eight-bit input and the 10-bit output that is related to the data R' in one-to-one correspondence. In this way, the data R normalized to 0 to 255 is restored to the correct data. The same processing is correspondingly applied to the remaining data G and B.

$$R' = \frac{255}{(R_{max}' - R_{min}')} \cdot (R - R_{min}') \tag{10}$$

Second Color Correction Unit

The second color correction unit 44 nonlinearly maps the combination of the input signals R', G', and B' (38), (39), and (40) to the combination of the output signals R", G", and B" 45, 46, and 47 by using a three-dimensional LUT in order that the gradation and the color reproduction on the color CRT screen are visually equivalent to those of the printed picture. The principle of the mapping will first be described.

When given input image data R, G, and B are displayed on the CRT screen, the X, Y, and Z tristimulus values viewed by an observer may be mathematically expressed by formula (11).

$$\begin{pmatrix} X \\ Y \\ Z \end{pmatrix} = \frac{100}{Y_{max}} \cdot \begin{pmatrix} x_r & x_g & x_b \\ y_r & y_g & y_b \\ z_r & z_g & z_b \end{pmatrix} \cdot \begin{pmatrix} C_r \cdot R^{\gamma r} \\ C_g \cdot G^{\gamma g} \\ C_b \cdot B^{\gamma b} \end{pmatrix} \tag{11}$$

In the above formula, $(x_r, y_r, z_r)$, $(x_g, y_g, z_g)$, and $(x_b, x_b, x_b)$ represent (x, y, z) chromaticity values of the phosphor materials of the CRT. $C_r$, $C_g$, $C_b$, $R^{\gamma r}$, $G^{\gamma g}$, and $B^{\gamma b}$ indicate parameters representing the characteristics of the phosphor materials. For input data D, $C \cdot D^\gamma$ indicates luminance. $100/Y_{max}$ indicates a parameter for normalizing the tristimulus value Y of white to 100.

In the above formula, the reflection components $(X_0, Y_0, Z_0)$ of a viewing light source (illuminating light from a fluorescent lamp, for example) on the CRT screen are additionally involved, and thus the resultant tristimulus values will be more exact.

It is assumed now that the X, Y, Z tristimulus values on the CRT screen are expressed by $(X_c, Y_c, Z_c)$, and the X, Y, Z tristimulus values under the viewing light source, by $(X_p, Y_p, Z_p)$.

When the tristimulus values $(X_c, Y_c, Z_c)$ are made to directly correspond to the tristimulus values $(X_p, Y_p, Z_p)$, the impressions created by these tristimulus values are different. However, if the tristimulus values on the CRT screen and the tristimulus values under the viewing light source, allowing for the chromatic adaptation, are converted into the R, G, B fundamental tristimulus values which are equal in white, the impressions by the two tristimulus values will be exactly the same.

Actually, the X, Y, Z tristimulus values are converted into the R, G and B fundamental tristimulus values using a matrix obtained from the chromaticity of the CRT phosphors, or a general conversion matrix (obtained by Jodd, Pitt, et al., for example).

$$R' = \frac{R_{pw}}{R_{cw}} \cdot R_c, \quad G' = \frac{G_{pw}}{G_{cw}} \cdot G_c B' = \frac{B_{pw}}{B_{cw}} \cdot B_c \tag{12}$$

where $(R_{cw}, G_{cw}, B_{cw})$ represent the R, G, and B fundamental tristimulus values of white on the CRT screen, and $(R_{pw}, G_{pw}, B_{pw})$ represent the R, G, and B fundamental tristimulus values of white (base density) on the printed picture.

Afterwards, using the above formulae, the R, G, and B fundamental tristimulus values on the CRT screen are converted, and the converted values are made to correspond to the R, G, and B fundamental tristimulus values on the printed picture. At this time, conversion is carried out in such a manner that the R, G, and B fundamental tristimulus values of black are the same, as given below:

$$R' = \frac{R_{pw} - R_{pk}}{R_{cw} - R_{ck}} \cdot (R_c - R_{ck}), \quad (13)$$

$$G' = \frac{G_{pw} - G_{pk}}{G_{cw} - G_{ck}} \cdot (G_c - G_{ck}),$$

$$B' = \frac{B_{pw} - B_{pk}}{B_{cw} - B_{ck}} \cdot (B_c - B_{ck}),$$

where $(R_{ck}, G_{ck}, B_{ck})$ indicate the R, G, and B fundamental tristimulus values of black on the CRT screen, and $(R_{pk}, G_{pk}, B_{pk})$ represent the R, G, and B fundamental tristimulus values of black on the printed picture. Then, the equality of the impressions by the tristimulus values on the CRT screen and by those under the viewing light source is further enhanced.

The X, Y, and Z tristimulus values of the printed picture may be obtained from the R, G, and B fundamental tristimulus values of the printed image thus made to correspond, using the inverse matrix of the matrix which was used for converting the X, Y, and Z tristimulus values into the R, G, and B fundamental tristimulus values.

To obtain desired X, Y, and Z tristimulus values on the printed picture, optical densities of C, M and Y single layers are measured or calculated, and the X, Y, and Z tristimulus values of the multilayers at that time are additionally measured or calculated, thereby to form tables. Optical densities of C, M and Y single layers are obtained referring to the prepared tables, and are output.

In the algorithm as described above, when the colors of the printed image thus constructed fall outside the color reproduction region, the color reproduction region must be compressed. Two methods of compressing the color reproduction region will be described.

The compressing method will be first described is a method of compressing the color reproduction region in a uniform color space. In this instance, the uniform color space is the L*, a*, b* color space. If required, another color space may be used as a matter of course.

As a first step, the colors outside the color reproduction region are projected onto the surface of the reproduction region. In this case, the color tint should not be changed, and they must be projected onto a point of the minimum difference between the colors before and after the compression. It is not proper that the tint of color be expressed simply by an angle in a plane normal to the L* axis because the colors contain distorted parts, even in a uniform color space. Thence, the colors of which the color shape appears to be the same hue, for example, are plotted on the a* and b*. The resultant loci are approximated by functions. In this case, the functions of degree three or so will ensure a satisfactory accuracy. The approximated curves of several tens of color tints are traced. The loci of other color tints may be traced through the interpolation using the adjacent curves. By moving the intended color along the locus, the color reproduction region can be compressed while keeping the color tint unchanged.

A second step eliminates the color distortion caused by projecting the color outside the reproduction region onto the surface of the reproduction region in the first step. At a point on the surface of the color reproduction region, there are present the color which should originally exist and a plurality of colors assigned to the point as the result of the compression. This state is deemed as a state in which the reproduction region is deformed by a force applied thereto. Further, it is presumed that the adjacent colors have stress, and the stress when transferred is attenuated according to a proper weighing function. On this assumption, an equilibrium state is calculated, thereby to obtain the color projected onto the reproduction region surface and the movement points of colors adjacent the projected color.

In this way, the color reproduction region can be compressed without change of the color tint or color distortion.

Another compressing method to be described below compresses the color reproduction region in the R, G, and B fundamental tristimulus values. The relations of R, G, and B fundamental tristimulus values on the CRT screen and those on the printed picture are given by:

$$R' = \frac{R_{pw}}{R_{cw}} \cdot R_c, \quad G' = \frac{G_{pw}}{G_{cw}} \cdot G_c, \quad B' = \frac{B_{pw}}{B_{cw}} \cdot B_c$$

If the data R', G' and B' calculated with formula (14) are outside the color reproduction region of the printer, the white data $(R_{pw}, G_{pw}, B_{pw})$ for the printer is reset to a white darker than the actual white data $(R'_{pwf}, G'_{pwf}, B'_{pw})$, viz., $$\frac{R_{pw}'}{R_{pw}} = \frac{G_{pw}'}{G_{pw}} = \frac{B_{pw}'}{B_{pw}} < 1 \quad (15)$$

As a result, the colors R", G" and B" made to correspond anew to the colors on the surface of the color reproduction region are obtained. The white value to be set is adjusted so that the respective colors are the same as the colors on the surface of the color reproduction region. After the colors outside the color reproduction region are thus made to correspond to the colors on the surface of the color reproduction region, the color distortion in the color reproduction region is calculated in terms of the R, G, and B fundamental tristimulus values by the process of the second step in the first compressing method, thereby to obtain the corresponding points of the respective colors. Since chromatic adaptation is involved in the second compressing method described above, neither color tint changes nor color distortion is caused in compressing the color reproduction region. With the algorithm stated above, a three-dimensional LUT of the combination of data (R', G', B') can be formed corresponding to the combination of the image data (R, G, B). (The data R', G', and B' converted as described in connection with the calibration unit 3 are converted, by the image data normalizing LUT, into C, M and Y data so that the data is printed in a desired density.)

The table thus obtained requires a large amount of memory capacity. To cope with this, in practical use, the color space of the input image data R, G, and B is thinned to form a lattice space. The combination of output data R, G, and B corresponding to the data at the lattice points is stored in a memory in the form of a three-dimensional LUT. The remaining data are obtained through interpolation using the data at the lattice points.

When the lattice is designed to take values corresponding to the m higher-order bit (m<8) of the input data, the number of lattice lines is 2m+1. However, 2m, rather than 2m+1, is preferable for the number of lattice lines when considering the memory capacity, the calculation of interpolation and the like. To this end, the input data is compressed to 0 to $256-2^{8-m}$, so that the number of lattice lines corresponding to the m higher-order bits is set to 2m.

Figure 10:
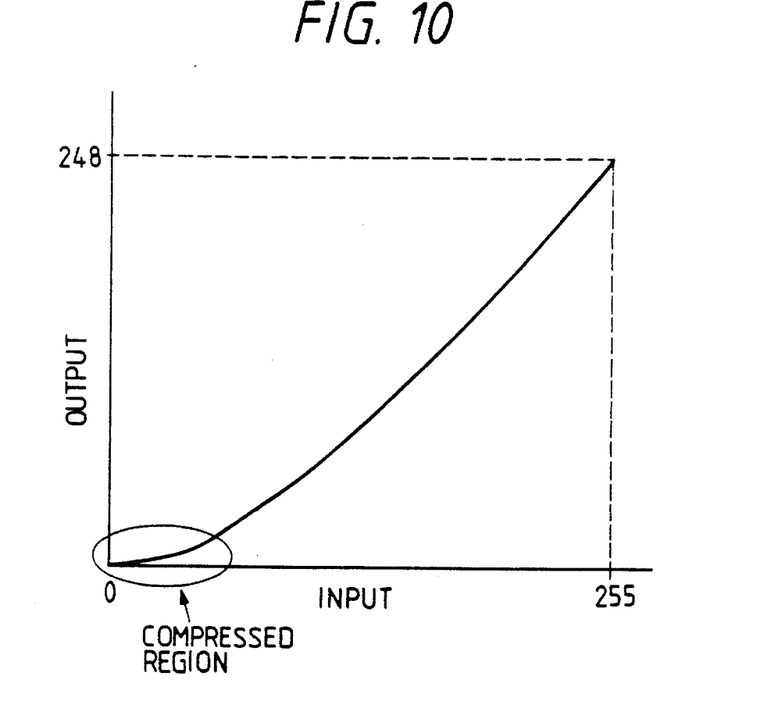
FIG. 10 is a graph used in explaining the reduction of the memory capacity of a three dimensional LUT of the second color correction unit.

To generate 32 lattice lines from the five higher-order bits, for example, the input data 0 to 255 is compressed to 0 to 248. For the compression, the same LUT is used for the three colors R, G, and B. Since the luminance on the monitor little changes in the region of small data, the compression may be performed in a data level region where the printing operation is little influenced, as shown in FIG. 10 showing the relationship of the output data vs. input data. Actually, this compression is carried out in the first color correction unit 37.

Figure 11:
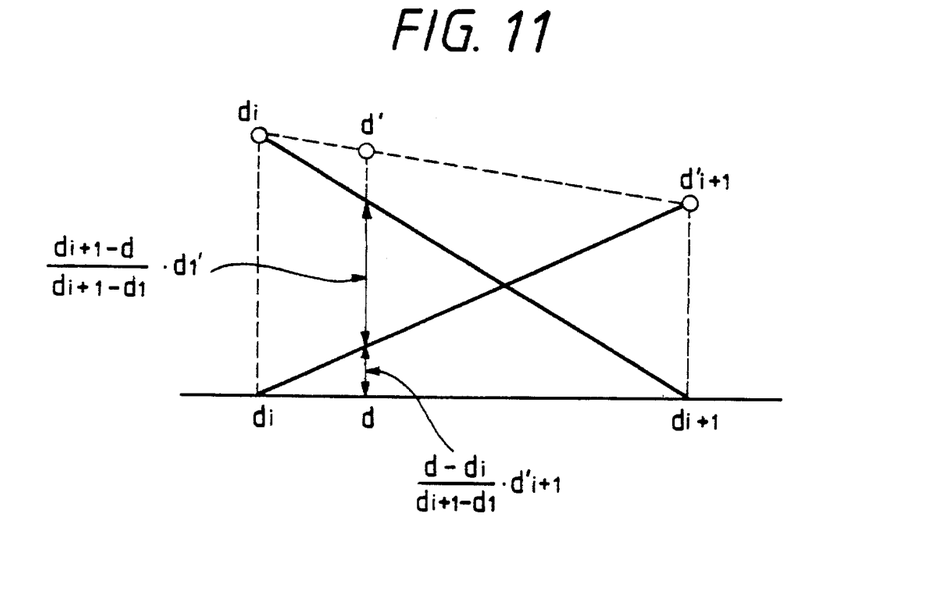
FIG. 11 is an explanatory diagram used in explaining the interpolation in the second color correction unit.

A calculation method using the three dimensional LUT will be described. The one-dimensional case will be considered for ease of explanation. For the input data d, data $d_i$ and $d'_{i+1}$ at the lattice points i and i+1 near the data d are read out of the table. The intended data d' is obtained by the linear interpolation as shown in FIG. 11.

$$d' = \frac{d_{i+1} - d}{d_{i+1} - d_i} \cdot d'_i + \frac{d - d_i}{d_{i+1} - d_i} \cdot d_{i+1}' \quad (16)$$

When formula (16) is expanded to the three-dimensional data R, G, and B, for the input data (R, G, and B), the data at eight lattice points $(R_i, G_j, b_k), \ldots$ are read out of the three dimensional table. Those items of data are multiplexed by the weights given below.

$$\frac{R_{i+1} - R}{R_{i+1} - R_i} \cdot \frac{G_{j+1} - G}{G_{j+1} - G_j} \cdot \frac{B_{k+1} - B}{B_{k+1} - B_k}, \quad (17)$$

$$\frac{R - R_i}{R_{i+1} - R_i} \cdot \frac{G_{j+1} - G}{G_{j+1} - G_j} \cdot \frac{B_{k+1} - B}{B_{k+1} - B_k},$$

$$\frac{R_{i+1} - R}{R_{i+1} - R_i} \cdot \frac{G - G_j}{G_{j+1} - G_j} \cdot \frac{B_{k+1} - B}{B_{k+1} - B_k},$$

$$\frac{R - R_i}{R_{i+1} - R_i} \cdot \frac{G - G_j}{G_{j+1} - G_j} \cdot \frac{B_{k+1} - B}{B_{k+1} - B_k},$$

$$\frac{R_{i+1} - R}{R_{i+1} - R_i} \cdot \frac{G_{j+1} - G}{G_{j+1} - G_j} \cdot \frac{B - B_k}{B_{k+1} - B_k},$$

$$\frac{R - R_i}{R_{i+1} - R_i} \cdot \frac{G_{j+1} - G}{G_{j+1} - G_j} \cdot \frac{B - B_k}{B_{k+1} - B_k},$$

$$\frac{R_{i+1} - R}{R_{i+1} - R_i} \cdot \frac{G - G_J}{G_{j+1} - G_j} \cdot \frac{B - B_k}{B_{k+1} - B_k},$$

$$\frac{R - R_i}{R_{i+1} - R_i} \cdot \frac{G - G_j}{G_{j+1} - G_j} \cdot \frac{B - B_k}{B_{k+1} - B_k},$$

The sum of the products of the multiplications is the intended output data. Since the lattice line intervals for each axis are all expressed by $2^{8-1}$, the weights are uniquely determined by the combinations of the (8–m) higher-order bits of the R, G, and B input data. Accordingly, if the weights are previously calculated for all of the combinations and stored in a memory, they can be accessed by merely referring to the table, that is, there is no need of weight calculation every time a weight is needed. Thus, the calculation of the input data (R, G, B) is realized with the sum product calculations shown in formula (18) below, which includes the output data $(R_i, G_i, B_i)$ (i=0, ..., 7) at the eight lattice points read out of the table with the combination of the m higher-order bits, the weights $w_i$ (i=0, ..., 7) at each lattice point read out of the table with the combination of the (8–m) lower-order bits.

$$R' = \sum_{i=0}^{7} (R_i \cdot W_i), \quad (18)$$

$$G' = \sum_{i=0}^{7} (G_i \cdot W_i),$$

$$B' = \sum_{i=0}^{7} (B_i \cdot W_i).$$

Third Color Correction Unit

Figure 12:
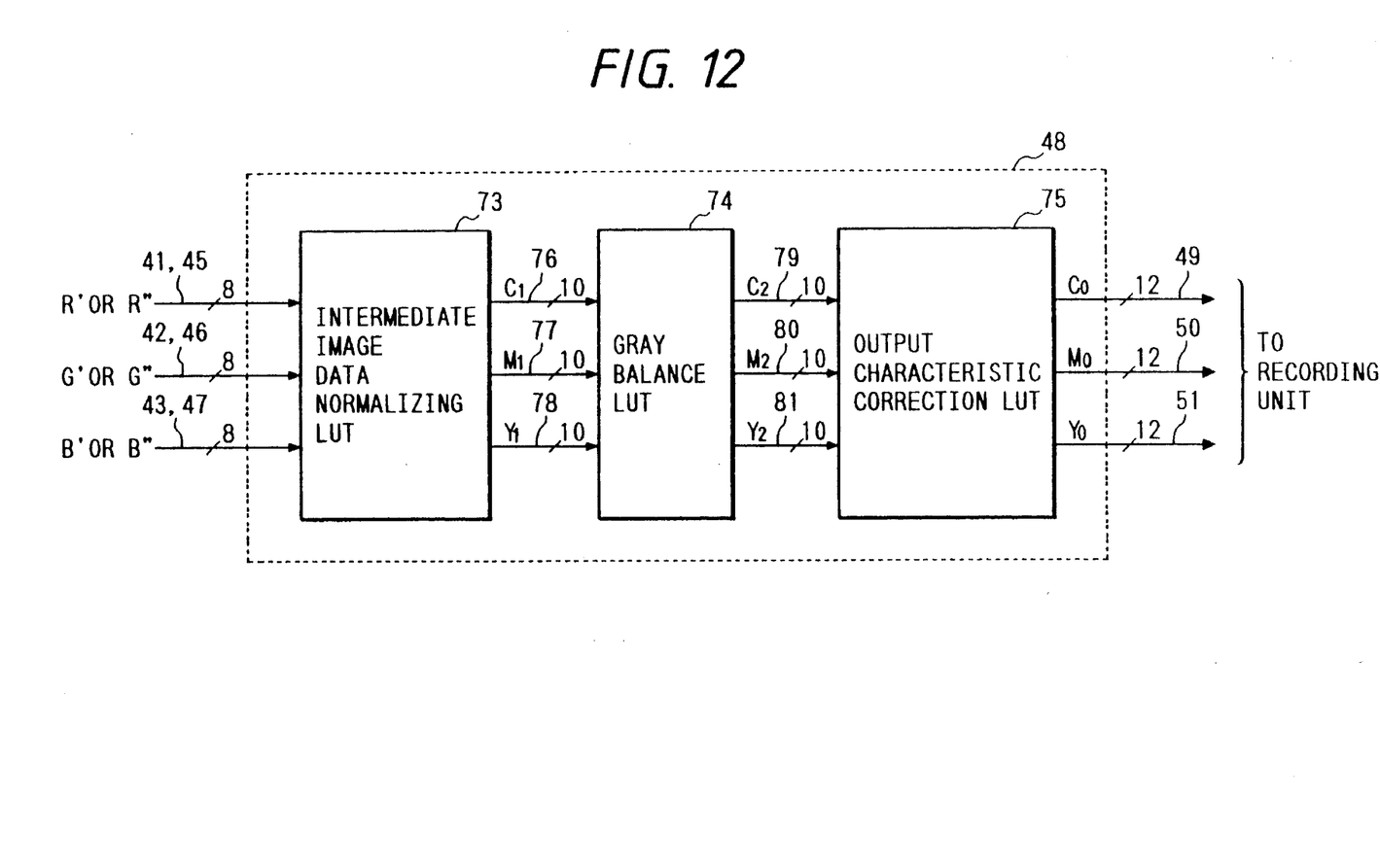
FIG. 12 is block diagram showing the detailed construction of the third color correction unit.

The third color correction unit performs a normalizing function to convert a region of data suitable for the color adjustment corresponding to the input image signal to a region of data suitable for the calibration, a calibration function, and a compensating function for correcting the characteristics of the coloring materials of the recording medium for the gray-scale reproduction property.

The third color correction unit will be described with reference to FIG. 12. The third color correction unit is composed of an intermediate image data normalizing LUT 73 consisting of LUTs for the respective colors, a gray balance LUT 74, an output-characteristic correction LUT 75. Those types of LUTs are connected in cascade fashion to combine a set of LUTs.

The intermediate image data normalizing LUT 73 normalizes the output image signals of the first color correction unit 37 or the second color correction unit 44 to 10-bit data of $C_1$ (76), $M_1$ (77), and $Y_1$ (78) in a region suitable for calibration.

Different types of LUTs are used for the intermediate image data normalizing LUT 73. A user may select a desired LUT from among the available LUTs from the operation panel 53 or the host computer. Of these LUTs, the first LUT is automatically selected when the second color correction unit is used, and is suitable for the image data for the color monitor display, as described above.

The remaining LUTs are used when various types of image data are handled, bypassing the second color correction unit 44. An LUT suitable for the case where the input image data is density data is contained in those LUTs. The data input in this case is normalized to 0 to 255 as described above with respect to the First Color Correction Unit. Accordingly, the R data signal, for example, is restored to the correct value by multiplying it by $(R_{max} - R_{min})/255$, and $R'_{min}$ is added to the product, whereby it is expanded to 10-bit data. The same process is correspondingly applied to the remaining color data G and B.

The gray balance LUT 74 is a fixed LUT for absorbing the characteristics of the coloring materials. The LUT converts independently each of $C_1$ (76), $M_1$ (77), and $Y_1$ (78) signals so that gray is recorded when $C_1 = M_1 = Y_1$.

The output characteristic correction LUT 75 is mainly used for compensating for manufacturing variations in the apparatus and in the recording medium used. The LUT converts the 10-bit output data $C_2$ (79), $M_2$ (80), and $Y_2$ (81) of the gray balance LUT (74) into 12-bit recording control signals $C_0$ (49), $M_0$ (50), and $Y_0$ (51), which ensures recording at the desired density. The correction curves used here may be calculated using parameters that are produced by prescribed calibration techniques, such as disclosed in Japanese Patent Laid-Open Publication No. Hei. 1-206236, for example. The parameters are stored in an EPROM and not destroyed even in the event of a power failure. The correction curves are calculated only at the time of power on and when the parameter is altered, and are stored in a RAM.

As described above, in the image recording apparatus of the invention, to cope with a case where the color reproducing characteristics, such as the color reproduction range, of the input image signals, are different from those of the recording medium, a color adjusting mechanism is provided which is designed, in consideration of the characteristics of the input image signals, to be operable according to the user's color perception, and hence is easy to control, with the provision of the adjusting means for making the hue and saturation adjustments for the look-up tables of the respective colors (contained in the third color correction unit), and for setting the look-up tables. The second color correction unit corrects and compresses the nonlinear relationships of the color reproduction regions between the input image signals and the recording medium, without changing the hue in color perception, by a three-dimensional look-up table designed in consideration of the chromatic adaptation, thereby realizing good color reproduction. Additionally, the third color correction unit compensates for manufacturing variations in the apparatus, and provides easy reproduction of setting the reference for color adjustment independently of the input image signals.

For the three-dimensional look-up table, a three-dimensional look-up table addressed with the n higher-order bits and an interpolation unit by the n lower-order bits for each color are provided. Further, a table memory for reducing the previous gradations is greatly reduced in memory capacity and hence in cost. An increase of the output time owing to the correction processing using the three dimensional look-up table is prevented by concurrent processing using at least three line buffers.

The unique features of the invention as mentioned above realize, at high speed and low cost, the correction of the input image signals with different color reproduction characteristics, which is difficult for the techniques of the prior art, and consequently the invention offers natural and good color reproduction. Provision of the color adjustment mechanism operable with easy color perception enables a user to make an easy adjustment for desired color reproduction.

The present invention is applicable for an image recording apparatus for recording a multi-tone image, such as hard copy, and a color copying machine.

What is claimed is:

1. A method employed by an image recording apparatus, which receives image signals representing colors, for compressing a color reproduction region of the image recording apparatus in a uniform color space, comprising the step of compressing said colors outside the color reproduction region onto a surface of the color reproduction region at respective points, which represent the minimum color difference between said colors before and after compression, without changing the color tint of said colors, said compressing step further comprising the steps of:

plotting those of said colors whose color shape appears to be of the same hue on a plane of $a*$ and $b*$ in a color space of $L*$, $a*$ and $b*$, so that the resultant loci are curve-approximated by functions; and moving, according to the curve-approximated loci, an intended color to project the colors onto their respective points of the minimum color difference between the colors before and after compression without varying the color tint.

2. A method employed by an image recording apparatus, which receives image signals representing colors, for compressing a color reproduction region of the image recording apparatus in the R, G and B fundamental tristimulus values, the method comprising the steps of:

calculating R', G' and B' fundamental tristimulus values of an image for recording based on said R, G and B fundamental tristimulus values;

determining whether said R', G' and B' fundamental tristimulus values are outside said color reproduction region; and adjusting the tristimulus values $R_{pw}$, $G_{pw}$ and $B_{pw}$ of white for the image recording apparatus when said R', G' and B' fundamental tristimulus values are determined to be outside said color reproduction region to cause those of said colors which are outside said color reproduction region to correspond to colors inside said color reproduction region.

* * * * *